United States Patent [19]
Niebylski

[11] 3,790,367
[45] Feb. 5, 1974

[54] ALUMINUM-LEAD METAL FOAMS

[75] Inventor: Leonard M. Niebylski, Birmingham, Mich.

[73] Assignee: Ethyl Corporation, Richmond, Va.

[22] Filed: Nov. 26, 1971

[21] Appl. No.: 202,643

[52] U.S. Cl. .................. 75/20 F, 75/20 R, 75/138
[51] Int. Cl. ..................................................... C21b
[58] Field of Search .................. 75/20 F, 20 R, 138

[56] References Cited
UNITED STATES PATENTS

| | | | |
|---|---|---|---|
| 2,895,819 | 7/1959 | Fiedler | 75/20 F |
| 3,379,517 | 4/1968 | Graper | 75/20 F |
| 3,214,265 | 10/1965 | Fiedler | 75/20 F |
| 3,300,296 | 1/1967 | Hardy et al | 75/20 F |
| 3,305,902 | 2/1967 | Bjorksten | 75/20 F |
| 3,669,654 | 6/1972 | Berry | 75/20 F |

OTHER PUBLICATIONS

Sachs, G. et al.; Practical Metallurgy; Cleveland (ASM) 1951, pp. 534–536.
Sachs, G. et al.; Practical Metallurgy; Cleveland (ASM) 1951, pp. 7–11.

*Primary Examiner*—Charles N. Lovell
*Assistant Examiner*—W. R. Satterfield
*Attorney, Agent, or Firm*—Donald L. Johnson; Robert A. Linn

[57] ABSTRACT

Relatively weak metal foams are produced by decomposing a blowing agent in a molten metal mass to form a foam, and subsequently cooling to form a set cellular product; the molten mass having at least two different metals and at least two liquid phases at the time of foaming. When foaming, the two phases have been intimately intermixed. One metal can be aluminum.

2 Claims, No Drawings

ALUMINUM-LEAD METAL FOAMS

BACKGROUND OF THE INVENTION

Foamed metals have been described; see, for example, U.S. Pat. Nos. 2,895,819; 3,300,296; and 3,297,431. In general, such foams are produced by adding a gas-evolving compound to a molten metal and heating the mixture to decompose the compound to prepare blowing gas. The gas expands causing the metal to foam. After foaming, the resultant body is cooled to form a foamed solid. The gas foaming solid can be a metal hydride such as $TiH_2$, $ZrH_2$, or lithium hydride, U.S. Pat. No. 2,983,597.

There is a need for materials possessing low strength. For example, such materials could be of use in the automotive industry for interior construction with enhanced passenger protection. This invention is directed to producing foams possessing weak strengths.

SUMMARY OF THE INVENTION

This invention pertains to a process for producing relatively weak metal foams, said process comprising decomposing in a molten metal mass a blowing agent which forms a gas below the melting temperature of said mass, thereby forming a foam, and subsequently cooling said foam to produce a set cellular product; said molten mass comprising at least two metals which are substantially non-reactive with each other, said mass also comprising an intimate mixture of at least two separate liquid phases.

This invention also pertains to the foams produced by the process. Foams of this type can be used to protect passengers and goods in vehicles from impact. Specific applications are use of low strength foams in instrument panels, dash boards, steering wheels and columns, interior side and front padding, bumpers, bumper guards, etc.

DESCRIPTION OF PREFERRED EMBODIMENTS

Blowing agents which may be used are exemplified by the solid foaming agents mentioned in U.S. Pat. No. 2,751,289. Other materials are the siliceous materials which release gas at foaming temperatures such as those in U.S. Pat. No. 3,300,296. The descriptions in those patents are incorporated by reference herein as if fully set forth. Preferred blowing agents are the metal hydrides; such compounds are mentioned in U.S. Pat. No. 2,393,906. Preferred metal hydrides are titanium, zirconium and hafnium hydrides.

The metal mass to be foamed is a liquid composed of at least two immiscible or relatively immiscible phases. It is necessary that distinct metals phases be present in the set cellular product. For this reason and because it is preferred that all the metals be solids at room temperature, mercury-containing mixtures are excluded from this invention.

Within the framework of the above criteria, the nature of the metals is not critical. As a general rule, the foams of this invention will be weaker than foams of the same density produced from similar metal mixtures which are completely miscible at foaming temperature.

Of the metals, aluminum is preferred for this invention. The relative amount of aluminum present in preferred foams of this invention is from about 50 weight percent to about 95 percent aluminum. Greater or lesser amounts of aluminum can be used. When using aluminum it is preferred that it be admixed with one or more metals selected from sodium, cadmium, bismuth, lead, potassium, thallium and indium. It is not necessary that only these metals be employed. There may be others which blend in one, or the other, or all liquid phases present at foaming temperature. A typical mixture which can be used is Almag 35 mixed with from about 1 to about 5 weight percent lead. Almag 35 has the typical composition

| | |
|---|---|
| silicon | 0.15 |
| iron | 0.15 |
| copper | 0.10 |
| manganese | 0.10–0.20 |
| titanium | 0.10–0.20 |

Other elements total 0.15; remainder aluminum. In a similar manner, from about 1 to about 5 weight percent lead can be admixed with other aluminum alloys such as those from the 2000, 3000, 4000, 5000, 7000 and 8000 series of alloys. Typical alloys are 2024, 7001, 7075, and the like. These designations for series and alloys are those set forth in Registration Record of Aluminum Association Alloy Designations and Chemical Composition Limits for Aluminum Alloys in the Form of Castings for Ingot, published by the Aluminum Association, 750 Third Avenue, New York, New York 10007 (Nov. 1, 1969).

The temperature employed is not a truly independent variable but is dependent at least in part on the nature of the metal and the nature of the blowing agent employed. The temperature employed is an elevated temperature sufficient to maintain the metal in a molten state while expansion takes place and also sufficient to thermally decompose the blowing agent to form blowing gas at a rate which yields foaming at the desired speed. The speed of foaming should not be so long as to unduly delay the process; likewise, it should not be too fast for blowhole formation or other untoward event may occur. Usually it is desirable to employ a temperature which allows the expansion period to be not more than about two minutes but greater decomposition periods can be used if desired. For aluminum-containing systems having at least about 50 weight percent blowing temperatures which can be used are from about 525°C. to about 725°C., a more preferable temperature range being from about 625° to about 690°C.

The amount of blowing agent is in general dependent upon the amount of expansion desired to achieve foams of equivalent densities from different metals may require different amounts of blowing agents. In general, from about 0.1 to 1.5 weight percent of blowing agent is utilized in the process of this invention. However, greater and lesser amounts can be employed if desired. As the amount of blowing agent increases (other process parameters remaining the same) preparation of less dense foams is favored.

All the blowing agent can be introduced in one addition. Alternatively, if desired two or more expansions can be carried out.

If desired, before the blowing agent is added, the mixture to be foamed can be thickened with a viscosity increasing amount of a viscosity increasing agent. Typical agents of this type are water, carbon dioxide (snow or gas), air, nitrogen, oxygen and argon. Making molten metals viscous by such agents is described in Niebylski et al., application Ser. No. 123,099, filed March 10, 1971. That application has a common assignee with the instant application and is incorporated by reference herein as if fully set forth.

As explained in application Ser. No. 123,099 supra, viscosity increasing agents and blowing agents are added with intensive stirring. Such stirring or other types of agitation to achieve substantially homogeneous mixing are employed in this invention. In the process provided herein, mixing such as rapid stirring is employed to achieve intimate mixing of the immiscible liquid phases to be blown. For aluminum-containing foams, thickening agents are added at temperatures of from about 75° to 800°C., preferably from about 550°C. to about 760°C.

EXAMPLE I

A mixture was made of 6400 grams of molten aluminum and 320 grams of molten lead. This mixture was thickened with 1280 grams of carbon dioxide snow at 760°C. At 675°C. 40.3 grams of zirconium hydride was added. (The carbon dioxide and hydride were added with intensive mixing.)

After hydride addition, resultant mixture was transferred at 780°-800°C. to a 15 × 15 × 4 ½ inches mold. Charge transfer was difficult and ca. 10 percent of the charge was retained in the mix pot. The mold filled to about 90 percent and an extremely good foam resulted.

A black powder seemed to cover ca. 90 percent of the foam surface. The foam had the appearance of pure aluminum — slightly darkened, with medium size pore averaging about ⅛ inch diameter. Density of foam ranged 9-18 pcf. throughout the sample due to heavy metal bottom formed.

EXAMPLE II

A mixture of Almag 35 + 1 percent by weight lead totalling 3,413.5 grams was thickened with 191 grams of carbon dioxide snow using rapid stirring. Upon initiation of the $CO_2$ addition the temperature of the molten mass was 735°C. When the temperature of the resultant medium viscous mixture was 690°C., 38.1 grams of $ZnH_2$ were added in a total of 9 aluminum foil-wrapped packets. The time of mixing of the hydride was 5-6 seconds and high speed stirring was used.

Thereafter ca. 95 percent the foaming mass was transferred to a 15 × 15 × 4 ½ stainless steel mold. The foam filled about 90 percent of the mold.

Upon cooling, the resultant foam had the appearance of a standard aluminum magnesium foam of 7 percent magnesium but slightly darkened. The pore quality was excellent; the average pore size was 1/16 inch or less. Foam density for each casting ranged from 10-15 pcf. and 13-18 pcf. density.

Following the procedure of the above examples using a thickening agent in amount of 1 to 6 weight percent of the metal mass to be foamed, and from 0.1 to 1.5 weight percent of a blowing agent selected from titanium, zirconium and hafnium hydride, similar foams are produced from aluminum alloys 7075, 2024, 5086, 6063, 2011, 2218, 3005, 4042, 4043 and 8280 admixed with 1 to 5 weight percent lead. The thickening agents used are air, oxygen, nitrogen, argon, carbon dioxide, steam and the like; the thickening temperature being from about 550° to about 760°C. The hydride is added at temperature from about 670° to 705°C.

Similar results are obtained when no thickening agent is employed.

Similar results are obtained when the metal is a binary aluminum mixture where the other metal is present in up to 10 weight percent and is selected from sodium, potassium, cadmium, thallium, indium, bismuth, and lead.

To illustrate the low strength of these foams various samples were prepared using the techniques of the above examples and their compressive strengths compared with other foams. The results are given in the table below with the compressive strengths given in psi/pcf (pounds per square inch per pound per cubic foot).

| | Compressive Strength | | | | | |
|---|---|---|---|---|---|---|
| Foam density | 8 | 10 | 12 | 14 | 18 | pcf. |
| AlMag 35 | 120 | 180 | 285 | 390 | 645 | |
| AlMag 35–1 % Pb | 55– 70 | 70– 86 | 88– 118 | 120– 160 | 175– 250 | |
| Al pure | 40 | 55 | 70 | 90 | 155 | |
| Al + 5 % Pb | 22 | 33 | 45 | 60 | 110 | |

I claim:

1. A process for producing a relatively weak metal foam, said process comprising
    forming a molten metal mass by heating the metals above their melting point, said molten metal mass comprising aluminum admixed with from about 1 to about 5 weight percent lead,
    forming an intimate mixture of the resultant 2 immiscible liquid phases by agitation of said mass,
    thermally decomposing a blowing agent in said intimate mixture of 2 immiscible liquid phases thereby producing a foam,
    subsequently cooling said foam, thereby forming a set cellular product, said cellular product having a lower compressive strength than foams of the same density and produced from similar metal mixtures which are completely miscible at foaming temperature.

2. Process of claim 1 additionally characterized by thickening the molten metal mass, prior to the blowing step, with an agent selected from the class consisting of water, carbon dioxide, air, nitrogen, oxygen, and argon.

* * * * *